Dec. 11, 1934.  O. WITTEL  1,984,103
REFLEX FINDER FOR MOTION PICTURE CAMERAS
Filed July 29, 1932
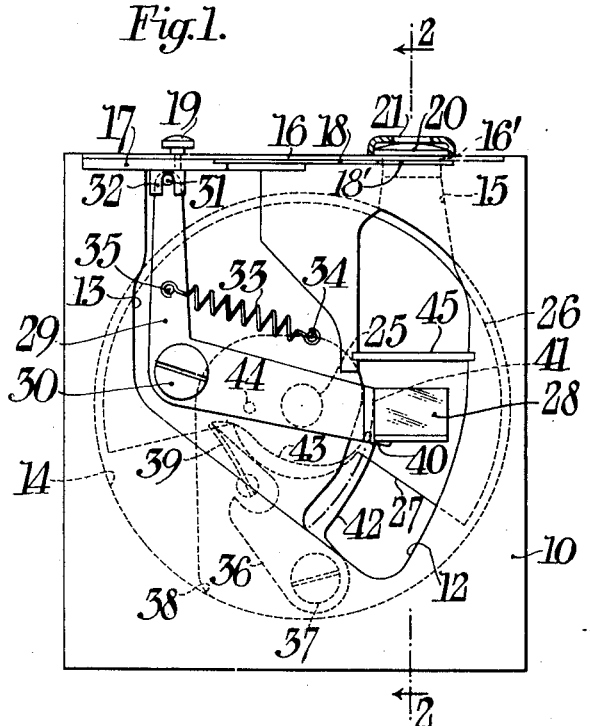
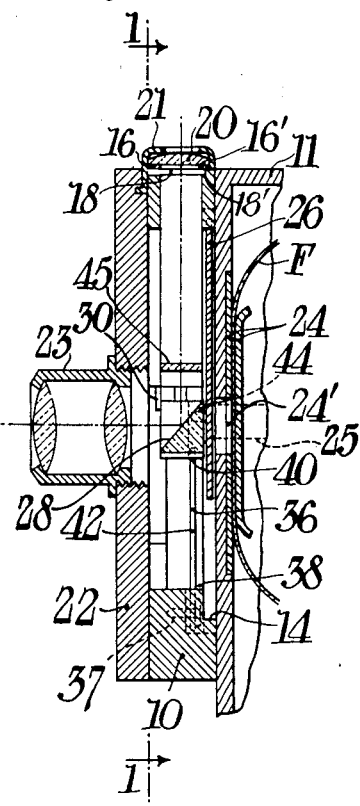
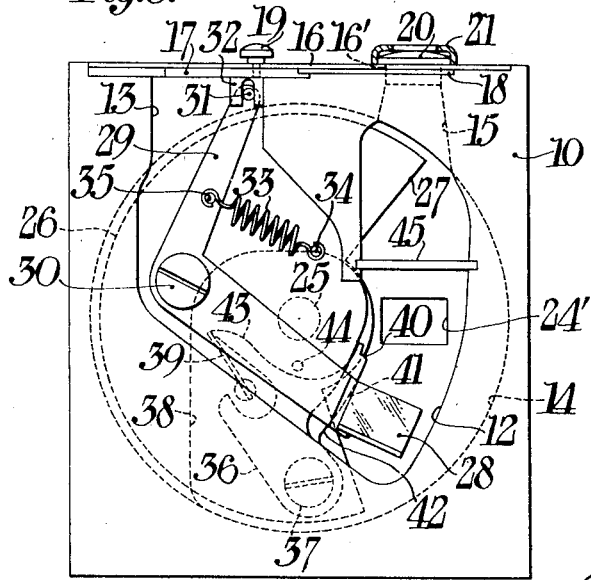
Otto Wittel, Inventor
By Newton M Persons
George A. Gillette, Jr.
Attorneys Patented Dec. 11, 1934

1,984,103

UNITED STATES PATENT OFFICE 1,984,103

REFLEX FINDER FOR MOTION PICTURE CAMERAS

Otto Wittel, Rochester, N. Y., assignor to Eastman Kodak Company, Rochester, N. Y., a corporation of New York Application July 29, 1932, Serial No. 625,986

6 Claims. (Cl. 88—16)

The present invention relates to a reflex finder for motion picture cameras and more particularly to a reflex finder which cooperates with a shutter for the viewing aperture of the finder.

It has been previously recognized that a reflex finder for a motion picture camera may cooperate with a shutter or closure means for the finder viewing aperture so that the film in the camera will not be fogged or light struck when the finder is in inoperative position. However, no provision has been made heretofore to insure that the reflex finder will be moved to assume an inoperative position upon operation of the camera.

The primary object of the present invention is the provision of a reflex finder in a motion picture camera which cooperates with a closure means for the finder viewing aperture and which is automatically caused to assume an inoperative position upon operation of the camera. Other objects of the invention will be suggested to those skilled in the art by the description which follows.

The objects of the invention are attained by the provision of a reflecting surface in a housing on the front of the camera, said reflecting surface being normally held in an inoperative position but adapted to be maintained in operative position by a holding means which is tripped upon operation of the camera. Arcuate surfaces on the holding means and on the reflecting surface cooperate to move the holding means into an inoperative position after it has been tripped by a pin on the rotating shutter.

Reference is hereby made to the accompanying drawing in the several figures of which similar reference characters designate similar elements and in which:

Fig. 1 is a vertical cross section taken on the line 1—1 of Fig. 2 and illustrates the various elements of the finder arrangement according to the invention in front elevation with the reflecting surface of the finder in operative position.

Fig. 2 is a vertical cross section of the finder and shutter housing taken on the line 2—2 of Fig. 1.

Fig. 3 is a view similar to the showing of Fig. 1 except that the reflecting surface of the finder is illustrated as being in its normal inoperative position.

In the illustrated embodiment of my invention the finder and shutter housing 10 is mounted upon the front of the camera casing 11. The housing 10 is provided with an aperture 12, an irregular recess 13 in the front face thereof and a circular recess 14 in the rear face thereof. A vertical channel 15 is also provided in housing 10 and communicates with aperture 12.

A cover plate 16 is mounted along the top of housing 10 and is provided with viewing aperture 16' in registration with the vertical channel 15. A closure means for channel 15 and aperture 16' is also provided in the top of housing 10 and comprises a slide 17 which is attached to a shutter 18. The shutter 18 may slide in a guideway 18' which is provided in the housing 10 beneath cover plate 16. Said shutter 18 in the extreme left hand position shown in Fig. 1 does not cover the viewing aperture 16'. A pin 19 is fastened to slide 17 and projects through a slot in cover plate 16 so that slide 17 and shutter 18 may be manually moved by the operator of the camera. The closure means represented by slide 17 and shutter 18 is adapted to assume an opened or a closed position, the opened position being that in which shutter 18 is in the position shown in Fig. 1 while the closed position is that in which shutter 18 closes vertical channel 15 as shown in Fig. 3. A lens 20 is maintained by a lens mount 21 in a position above vertical channel 15 and aperture 16' and in registration with said channel 15 and aperture 16'.

A plate 22 is attached to the front of housing 10, see Fig. 2, and supports the camera objective 23. A pair of gate members 24, one of which is provided with an exposure aperture 24', are mounted in a well recognized manner within camera casing 11 so that the film F is maintained in proper position for exposure through the camera objective 23 and exposure aperture 24'. A shaft 25 is rotatably mounted and is driven by suitable mechanism in camera casing 11. A circular shutter 26 is attached to the end of shaft 25 and rotates within the circular recess 14 of housing 10. The film F is advanced between the pair of gate members 24 in the usual manner and the exposure of said film F through objective 23 is controlled by circular shutter 26 which is provided with a recessed sector 27 for this purpose.

The reflecting surface of the reflex finder is adapted to be positioned with respect to the camera objective to reflect the image formed by the objective upwardly through vertical channel 15 and viewing aperture 16'. A mirror 28 or equivalent optical element is mounted upon a movable member in the housing 10 to perform the function above stated. The member supporting said reflecting surface may be bell crank 29 which is intermediately pivoted to housing 10 by a bolt 30. Bell crank 29 is partially located within the irregular recess 13 and supports on one end the reflecting surface or mirror 28 so that it is movable within aperture 12. The other end of bell crank 29 is provided with a pin 31 which slidably engages a slotted member 32 attached to the under-surface of slide 17. A resilient means for normally maintaining the bell crank 29 with mirror 28 in inoperative position may be composed of a coil spring 33 which has one end attached to a pin 34 located in the irregular recess 13 of housing 10 and which has the other end attached to a pin 35 on one arm of bell crank 29.

A holding means for maintaining the closure means, composed of slide 17 and shutter 18, in opened position and for maintaining the reflecting surface, composed of mirror 28, in position to reflect the image formed by objective 23 through vertical channel 15 and aperture 16', may comprise a trigger 36 which is rotatably mounted by a bolt 37 within a trigger recess 38 provided in the rear of housing 10. A leaf spring 39 urges trigger 36 into the position shown in Fig. 1 in which position a notch 40 in trigger 36 engages bell crank 29 to maintain the reflecting surface in operative position for reflection of the image formed by objective 23 upwardly through viewing aperture 16'. An arcuate surface 41 is provided on the rear of bell crank 29 and has its center at the center of bolt 30. A second arcuate surface 42 is provided on one edge of trigger 36 and is eccentric with respect to the axis through bolt 30 as indicated by the dot-dash line in Fig. 1. The upper surface 43 of trigger 36 is also of arcuate formation and has a portion lying within the path of a projection 44 which is eccentrically located on the face of circular shutter 26.

A ground glass screen 45 is located within aperture 12 for the formation of the image from objective 23 when the reflecting surface is in operative position.

The operation of the reflex finder according to the invention will now be described. The normal position of the finder elements is illustrated in Fig. 3. If pin 19 is manually moved so that shutter 18 uncovers vertical channel 15, the bell crank 29 will be moved against the action of coil spring 33 and the reflecting surface or mirror 28 will be moved into the position shown in Fig. 1. In this operative position of the reflecting surface the image formed by objective 23 is directed onto ground glass screen 45 and upwardly through vertical channel 15 so that it may be observed through the finder lens 20. The reflecting surface is maintained in this operative position by the holding means. In other words the trigger 36 is moved by leaf spring 39 so that notch 40 engages the lower edge of arcuate surface 41 on bell crank 29. The object or scene to be photographed can now be directly observed through the reflex finder which is maintained in this position without further manual assistance so that the operator is free to use both hands for the necessary adjustments of the camera. One great advantage of the present invention is that the operator need not manually move the reflecting surface back into inoperative position because this movement is accomplished automatically. Upon operation of the camera, the circular shutter 26 is rotated and projection 44 strikes against the upper surface 43 of trigger 36 so that notch 40 is disengaged from the lower edge of arcuate surface 41 and coil spring 33 becomes active to move bell crank 29. Arcuate surface 41 on bell crank 29 and arcuate surface 42 on trigger 36 now cooperate and due to the eccentricity of arcuate surface 42 the trigger 36 is moved so that upper surface 43 is no longer in the path of the projection 44 on circular shutter 26.

Since many modifications of the present invention may be developed without departing from the spirit of the invention, the present disclosure is to be construed in an illustrative sense only, the scope of the invention being defined in the appended claims.

Having now particularly described my invention what I desire to secure by Letters Patent of the United States and what I claim is:

1. In a motion picture camera, the combination with an objective adapted to produce an image upon a film, a rotatable shutter between said objective and said film, a housing provided with a viewing aperture, a member including a reflecting surface adapted in operative position to reflect said image toward said aperture, a closure means movable with said member into open and closed positions with respect to said aperture, and a resilient means for biasing said member and said closure means to inoperative and closed positions, respectively, of a holding means adapted to maintain said closure means in open position and said reflecting means in said operative position against the action of said resilient means, and a trip means on said shutter and adapted to move said holding means for return of said closure means and said member to respective closed and inoperative positions by said resilient means.

2. In a motion picture camera, the combination with an objective adapted to produce an image upon a film, a rotatable shutter between said objective and said film, a housing provided with a viewing aperture, a member including a reflecting surface adapted in operative position to reflect said image toward said aperture, a closure means movable with said member into open and closed positions with respect to said aperture, and a resilient means for biasing said member and said closure means to inoperative and closed positions, respectively, of a holding means adapted to engage said member and to maintain said closure means and said reflecting means in open and operative positions, respectively, against the action of said resilient means, and a means rotating with said shutter and adapted to disengage said holding means and permit the return of said member and said closure means by said resilient means.

3. In a motion picture camera, the combination with an objective adapted to produce an image upon a film, a rotatable shutter between said objective and said film, a housing provided with a viewing aperture, a member including a reflecting surface adapted to occupy an operative and an inoperative position and in said operative position to reflect said image through said aperture, and a closure means associated with said member and movable into open and closed positions with respect to said aperture, said member being in operative position when said closure means is open and being in inoperative position when said closure means is closed, of a spring member normally maintaining said member and said closure means in inoperative and closed positions, respectively, a holding means adapted in operative position to engage said member and to maintain said closure means in open position and said reflecting means in operative position in spite of the action of said spring member, and a means rotating with said shutter and adapted to disengage the first mentioned member from said holding means when they are in respective operative positions.

4. In a motion picture camera, the combination with an objective adapted to produce an image upon a film, a rotatable shutter between said objective and said film, a member including a reflecting surface adapted in operative position to deflect said image, and a resilient means for biasing said reflecting surface to inoperative position of a holding means adapted to engage and to maintain said member in operative position, a trip means on said shutter and adapted to disengage said holding means from said member which returns to inoperative position under the influence of said resilient means, and surfaces on said member and said holding means adapted to cooperate and to move the latter out of the path of said trip means.

5. In a motion picture camera, the combination with an objective adapted to produce an image upon a film, a rotatable shutter between said objective and said film, and a member rotatably mounted and supporting a reflecting surface adapted in operative position to deflect said image, of a trigger rotatably mounted and adapted to engage and maintain said member in operative position, a projection on said shutter adapted to disengage said trigger from said member, and arcuate surfaces provided respectively on said member and said trigger and adapted to cooperate upon disengagement of said trigger from said member, one of said surfaces being eccentric to move said trigger out of the path of said projection.

6. In a motion picture camera, the combination with an objective adapted to project an image onto a film, a rotatable shutter having a projection eccentrically located thereon, a housing provided with a viewing aperture, a bell crank carrying on one end a reflecting surface adapted to reflect said image into said aperture, and a slidable shutter engaging the other end of said bell crank and adapted to close said aperture, of a trigger adapted to engage said bell crank and to be disengaged by said projection on the rotatable shutter, and cooperating surfaces on said bell crank and said trigger, at least one of said surfaces being eccentric and adapted to move said trigger out of the path of said projection.

OTTO WITTEL.